US012165827B2

(12) United States Patent
Kawakami et al.

(10) Patent No.: US 12,165,827 B2
(45) Date of Patent: Dec. 10, 2024

(54) X-RAY GENERATION DEVICE

(71) Applicant: HAMAMATSU PHOTONICS K.K., Hamamatsu (JP)

(72) Inventors: Hiroki Kawakami, Hamamatsu (JP); Kazumi Kageyama, Hamamatsu (JP); Yoshito Hasegawa, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 214 days.

(21) Appl. No.: 17/915,198

(22) PCT Filed: Jan. 12, 2021

(86) PCT No.: PCT/JP2021/000685
§ 371 (c)(1),
(2) Date: Sep. 28, 2022

(87) PCT Pub. No.: WO2021/199563
PCT Pub. Date: Oct. 7, 2021

(65) Prior Publication Data
US 2023/0123985 A1 Apr. 20, 2023

(30) Foreign Application Priority Data
Apr. 3, 2020 (JP) ................................ 2020-067652

(51) Int. Cl.
*H01J 35/18* (2006.01)
*H01J 35/08* (2006.01)

(52) U.S. Cl.
CPC ........... *H01J 35/186* (2019.05); *H01J 35/116* (2019.05)

(58) Field of Classification Search
CPC .......... H01J 35/32; H01J 35/112; H01J 35/00; H01J 35/14; H01J 35/147; H01J 35/153;
(Continued)

(56) References Cited

U.S. PATENT DOCUMENTS

2017/0336334 A1 11/2017 Yun et al.
2019/0279836 A1* 9/2019 Takahashi .............. H01J 35/18
2020/0035440 A1 1/2020 Yun et al.

FOREIGN PATENT DOCUMENTS

CN 101960296 A 1/2011
CN 103765548 A 4/2014
(Continued)

OTHER PUBLICATIONS

International Preliminary Report on Patentability mailed Oct. 13, 2022 for PCT/JP2021/000685.

*Primary Examiner* — Don K Wong
(74) *Attorney, Agent, or Firm* — Faegre Drinker Biddle & Reath LLP

(57) ABSTRACT

An X-ray generation device includes: an electron gun that emits an electron beam; a target portion in which a plurality of elongated targets that generate an X-ray because of incidence of the electron beam are disposed parallel to each other; a housing that accommodates the electron gun and the target portion; and an X-ray emission window provided in the housing to emit the X-ray generated in the target portion, to an outside of the housing. The targets are disposed on the target portion to face the electron gun at a predetermined inclination angle with respect to an emission axis of the electron beam. The X-ray emission window is disposed at a position where the X-ray generated in a direction perpendicular to the target portion is transmittable through the X-ray emission window, to face the target portion at a predetermined inclination angle.

10 Claims, 6 Drawing Sheets

(58) Field of Classification Search
CPC ................. H01J 35/18; H01J 2235/086; H01J 2235/1204; H01J 35/30; H01J 2235/00; H01J 2235/08; H01J 2235/081; H01J 2235/088; H05G 1/52; H05G 1/04; H05G 1/00
See application file for complete search history.

(56) References Cited

FOREIGN PATENT DOCUMENTS

| | | | |
|---|---|---|---|
| CN | 103903940 | A | 7/2014 |
| CN | 105374654 | A | 3/2016 |
| JP | 2007-128848 | A | 5/2007 |
| JP | 2012-032387 | A | 2/2012 |
| JP | 2012-182078 | A | 9/2012 |
| JP | 2017-514583 | A | 6/2017 |
| JP | 2017-523386 | A | 8/2017 |
| JP | 6232603 | B2 | 11/2017 |
| TW | 201926396 | A | 7/2019 |
| WO | WO-2015/168473 | A1 | 11/2015 |
| WO | WO-2015/187219 | A1 | 12/2015 |
| WO | WO-2019/172269 | A1 | 9/2019 |

* cited by examiner

X-RAY GENERATION DEVICE

TECHNICAL FIELD

The present disclosure relates to an X-ray generation device.

BACKGROUND ART

As an X-ray generation device of the related art, for example, there is an X-ray diffraction imaging system described in Patent Literature 1. The X-ray generation device of the related art includes a target portion formed by embedding a plurality of metals such as tungsten in a diamond substrate. An electron beam emitted from an electron gun is incident on the target portion at a constant inclination angle. An X-ray emission window is disposed parallel to the target portion, and X-rays generated in the target portion are emitted at the X-ray emission window in a direction perpendicular to the target portion.

CITATION LIST

Patent Literature

Patent Literature 1: Japanese Unexamined Patent Publication No. 2017-514583

SUMMARY OF INVENTION

Technical Problem

When the X-ray generation device is combined with an imaging device such as an image tube, in order to sufficiently secure a contrast of a captured image of an object obtained by the image tube or the like, it is preferable that the X-rays are emitted at the X-ray emission window in the direction perpendicular to the target portion. In addition, a magnification of the X-ray image of the object obtained by the image tube or the like is determined by a ratio of a distance between an X-ray focal point (X-ray generation position) and an imaging position (focus to image distance: FID) to a distance between the X-ray focal point and the object (focus to object distance: FOD). Therefore, it is preferable that the X-ray generation device has a smaller FOD.

In the above-described configuration of Patent Literature 1, in order to emit the X-rays at the X-ray emission window in the direction perpendicular to the target portion and to obtain a smaller FOD, it is necessary to narrow a space between the X-ray emission window and the target portion, in which the electron gun is disposed. In this case, a disposition relationship between the electron gun and the target portion changes, and the electron beam is incident at an angle closer to being parallel to the target portion. However, when an incident angle of the electron beam is close to parallel to the target portion, it is considered that the electron beam is not incident to an inside of the target portion and is likely to be reflected on a surface of the target portion. In this case, a problem may occur that the ratio of the electron beam contributing to the generation of the X-ray, namely, the efficiency of conversion of the electron beam incident on the target portion into the X-rays decreases, and the X-ray generation efficiency decreases.

The present disclosure is conceived to solve the above problem, and an object of the present disclosure is to provide an X-ray generation device capable of obtaining a sufficient X-ray generation efficiency while obtaining a desired contrast and FOD.

Solution to Problem

An X-ray generation device according to one aspect of the present disclosure includes: an electron gun portion that emits an electron beam; a target portion in which a plurality of elongated targets that generate an X-ray because of incidence of the electron beam are disposed parallel to each other; a housing portion that accommodates the electron gun portion and the target portion; and an X-ray emission window portion provided in the housing portion to emit the X-ray generated in the target portion, to an outside of the housing portion. The targets are disposed on the target portion to face the electron gun portion at a predetermined inclination angle with respect to an emission axis of the electron beam. The X-ray emission window portion is disposed at a position where the X-ray generated in a direction perpendicular to the target portion is transmittable through the X-ray emission window portion, to face the target portion at a predetermined inclination angle.

In the X-ray generation device, the X-ray emission window portion is provided at the position where the X-ray generated in the direction perpendicular to the target portion is transmittable through the X-ray emission window portion, and the X-ray emission window portion is disposed at the position to face the target portion at the predetermined inclination angle. In the X-ray generation device, such disposition of the X-ray emission window portion is adopted, so that the X-ray generated in the direction perpendicular to the target portion can be extracted from the X-ray emission window portion without the incident angle of the electron beam being close to parallel to the target portion. Therefore, a sufficient X-ray generation efficiency can be obtained while obtaining a desired contrast and FOD.

The X-ray generation device may include a target portion support portion that supports the target portion such that the targets face the electron gun portion at the predetermined inclination angle with respect to the emission axis of the electron beam, and the target portion may be supported in a state where at least a part of the target portion is embedded in the target portion support portion. In this case, heat generated in the target portion because of the incidence of the electron beam can be efficiently transferred to the target portion support portion. Therefore, the consumption of the targets can be suppressed.

At least some of the targets may be in contact with the target portion support portion. In this case, heat generated in the targets because of the incidence of the electron beam can be directly transferred to the target portion support portion. Therefore, the consumption of the targets can be further suppressed.

The housing portion may include a support portion accommodating portion that accommodates the target portion support portion. The support portion accommodating portion may include an aperture portion that introduces the electron beam from the electron gun portion toward the target portion, and a window portion holding portion that surrounds the target portion support portion and that holds the X-ray emission window portion. As described above, both appropriate incidence of electrons and appropriate disposition of the X-ray emission window portion with respect to the target portion can be achieved by forming the support portion accommodating portion through a combination of the aperture portion and the window holding portion.

The window portion holding portion may include a fixation portion to which the X-ray emission window portion is fixed, and a protrusion protruding from an inside to the outside of the housing portion to surround the fixation portion. In this case, even when reflected electrons (for example, electrons or the like caused by the electron beam reflected by the target portion and the like) are incident on the X-ray emission window portion or the fixation portion to generate heat, since the heat is transferred to the protrusion having a large heat capacity, an adverse influence such as damage to the X-ray emission window portion or the fixation portion can be suppressed.

A thickness of the aperture portion may be larger than a thickness of the fixation portion. In this case, the heat capacity of the aperture portion can be increased. For this reason, the influence of heat generated by, for example, electrons of the electron beam from the electron gun can be suppressed, the electrons being incident on the aperture portion.

The support portion accommodating portion may include a heat radiation portion thermally coupled to a base end portion of the target portion support portion, and a thickness of the heat radiation portion may be larger than at least one of a thickness of the protrusion and a thickness of the aperture portion. In this case, heat generated in the target portion is transferred to the target portion support portion, and the heat is transferred to the heat radiation portion having a large heat capacity, so that the heat generated in the target portion can be efficiently removed.

A cooling portion that circulates a cooling medium may be provided on an inside of a wall portion of the support portion accommodating portion. The support portion accommodating portion can be efficiently cooled by circulating the cooling medium through the cooling portion.

The support portion accommodating portion may include a heat radiation portion thermally coupled to a base end portion of the target portion support portion, and the cooling portion may be disposed at least in the aperture portion and in the heat radiation portion. Accordingly, the support accommodating portion can be efficiently cooled.

A disposition region of the targets may be sized to include an incident region of the electron beam on the target portion. In this case, it is possible to suppress the shift of the incident region of the electron beam on the target portion from the disposition region of the target portion, which is caused by a change in the incident position and the size of the electron beam, the movement of the position of the target portion by the thermal expansion of the target portion, or the like. Therefore, the X-ray can be reliably generated.

Advantageous Effects of Invention

According to the present disclosure, a sufficient X-ray generation efficiency can be obtained while obtaining a desired contrast and FOD.

DESCRIPTION OF EMBODIMENTS

Hereinafter, an exemplary embodiment of an X-ray generation device according to one aspect of the present disclosure will be described in detail with reference to the drawings.

Figure 1:
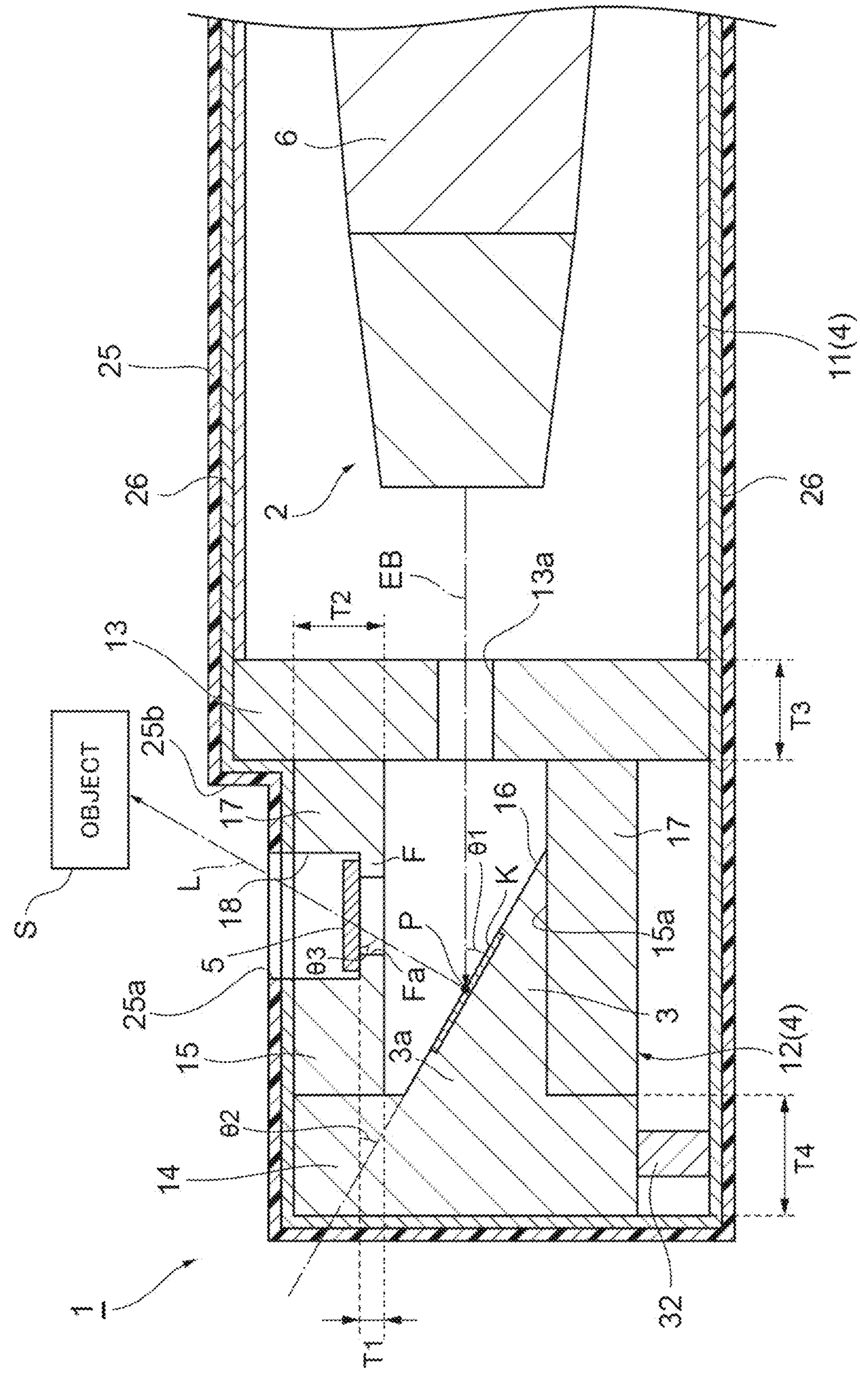
FIG. 1 is a schematic cross-sectional view showing one embodiment of an X-ray generation device.

FIG. 1 is a schematic cross-sectional view showing one embodiment of the X-ray generation device. As shown in the same drawing, an X-ray generation device 1 includes an electron gun (electron gun portion) 2 that emits an electron beam EB; a target support (target portion support portion) 3 that supports a target portion K in which a plurality of elongated targets 22 that generate X-rays L because of incidence of the electron beam EB (refer to FIG. 2) are disposed parallel to each other; a housing (housing portion) 4 that accommodates the electron gun 2 and the target support 3; and an X-ray emission window 5 provided in the housing 4 to emit the X-rays L generated in the target portion K, to the outside of the housing 4. In the example of FIG. 1, the X-ray generation device 1 is assembled into a nondestructive inspection device for an object S.

The electron gun 2 is a portion that generates and emits the electron beam EB having an energy of, for example, approximately several keV to several 100 keV. The electron gun 2 includes a filament, a grid, and an internal wiring connected to the filament, and the like. The filament is an electron releasing member that releases electrons that are the electron beam EB, and is made of, for example, a material containing tungsten as a main component. The grid is an electric field forming member that pulls electrons out and suppresses the diffusion of the electrons, and is disposed to cover the filament.

A base portion 6 that holds the electron gun 2 is made of, for example, an insulating material such as ceramic. A high withstand voltage type connector (not shown) that receives a supply of a power supply voltage of approximately several kV to several 100 kV from the outside of the X-ray generation device 1 is attached to an end portion of the base portion 6. The internal wiring connected to the filament is connected to the high withstand voltage type connector through an inside of the base portion 6.

The filament is heated to high temperature by receiving a current supply from an external power supply and releases electrons by being subjected to a negative high voltage of approximately—several kV to—several hundreds of kV. The electrons released from the filament are emitted from a hole formed at a part of the grid, as the electron beam EB. A negative high voltage is applied to the filament whereas the housing 4 and the target portion K (and the target support 3) serving as an anode have a ground potential. For this reason, the electron beam EB emitted from the electron gun 2 is incident on the target portion K in a state where the electron beam EB is accelerated by a potential difference between the filament and the target portion K. The X-rays L are generated in the targets 22 of the target portion K by the incident electron beam EB. A size of the electron beam EB (beam size) at an incident position P on the target portion K, namely, an incident region ER (refer to FIG. 2) of the electron beam EB is, for example, approximately $\phi$1 mm.

The housing 4 includes an electron gun accommodating portion 11 that accommodates the electron gun 2, and a support accommodating portion (support portion accommodating portion) 12 that accommodates the target support 3. The electron gun accommodating portion 11 and the support accommodating portion 12 are airtightly coupled to each other, so that the housing 4 forms a vacuum container having a substantially cylindrical shape as a whole. For example, the electron gun accommodating portion 11 is formed in a hollow cylindrical shape from a metal material such as stainless steel and is disposed to surround the electron gun 2. A tip portion of the electron gun accommodating portion 11 (electron beam EB emission side) is airtightly coupled to an aperture portion 13 (to be described later) of the support accommodating portion 12. An opening portion having, for example, a circular cross section is provided at a base end portion of the electron gun accommodating portion 11, and a lid portion provided with the above-described high withstand voltage type connector is airtightly coupled to the opening portion.

The support accommodating portion 12 is made of, for example, a metal material having good conductivity and heat transfer, such as copper. In the present embodiment, the support accommodating portion 12 includes the aperture portion 13 that introduces the electron beam EB from the electron gun 2 toward the target portion K, a heat radiation portion 14 thermally coupled to a base end portion 3*a* of the target support 3, and a window holding portion (window portion holding portion) 15 that surrounds the target support 3 and that holds the X-ray emission window 5. The window holding portion 15 is formed in a hollow cylindrical shape, and the aperture portion 13 and the heat radiation portion 14 are formed in a disk shape. The aperture portion 13 is airtightly coupled to one end side (electron gun 2 side) of the window holding portion 15, and the heat radiation portion 14 is airtightly coupled to the other end side (side opposite to the electron gun 2) of the window holding portion 15, so that the support accommodating portion 12 is formed in a cylindrical shape as a whole to surround the target support 3.

The aperture portion 13 has, for example, a disk shape having substantially the same outer diameter as an outer diameter of the electron gun accommodating portion 11. An opening portion (aperture) 13*a* having a circular cross section and penetrating through the aperture portion 13 in a thickness direction of the aperture portion 13 is formed at a substantially central portion of the aperture portion 13. The electron beam EB emitted from the electron gun 2 is introduced into the support accommodating portion 12 through the opening portion 13*a*.

The heat radiation portion 14 has, for example, a disk shape having a slightly smaller diameter than that of the aperture portion 13. In the heat radiation portion 14, the target support 3 that protrudes toward an aperture portion 13 side and is located inside the window holding portion 15 is provided on a surface side facing the aperture portion 13. Here, the target support 3 and the heat radiation portion 14 are integrally formed but may be separately formed. One surface side of the target support 3 has an arc shape corresponding to an inner peripheral surface 15*a* of the window holding portion 15 and is airtightly coupled to the inner peripheral surface 15*a*. Accordingly, the target support 3 protruding toward the aperture portion 13 side is also thermally coupled to the window holding portion 15.

The target portion K is disposed on a target support surface 16 that is the other side of the target support 3, such that the targets 22 face the electron gun 2 at a predetermined inclination angle θ1 with respect to an emission axis of the electron beam EB. More specifically, a recessed portion is formed in the target support surface 16, and the target portion K is embedded in the recessed portion. A back surface Kb and side surfaces Ks of the target portion K (refer to FIG. 2) are in contact with inner surfaces of the recessed portion directly or through a bonding material having good thermal conductivity, and the target support surface 16 and a surface Kf that is an electron incident side of the target portion K are flush with each other. Namely, the target support surface 16 is configured to be disposed on the same plane as the surface Kf of the target portion K, and the inclination angle θ1 of the target support surface 16 with respect to the emission axis of the electron beam EB is, for example, 20° to 70°. In the example of FIG. 1, the inclination angle θ1 is 30°.

Figure 2:
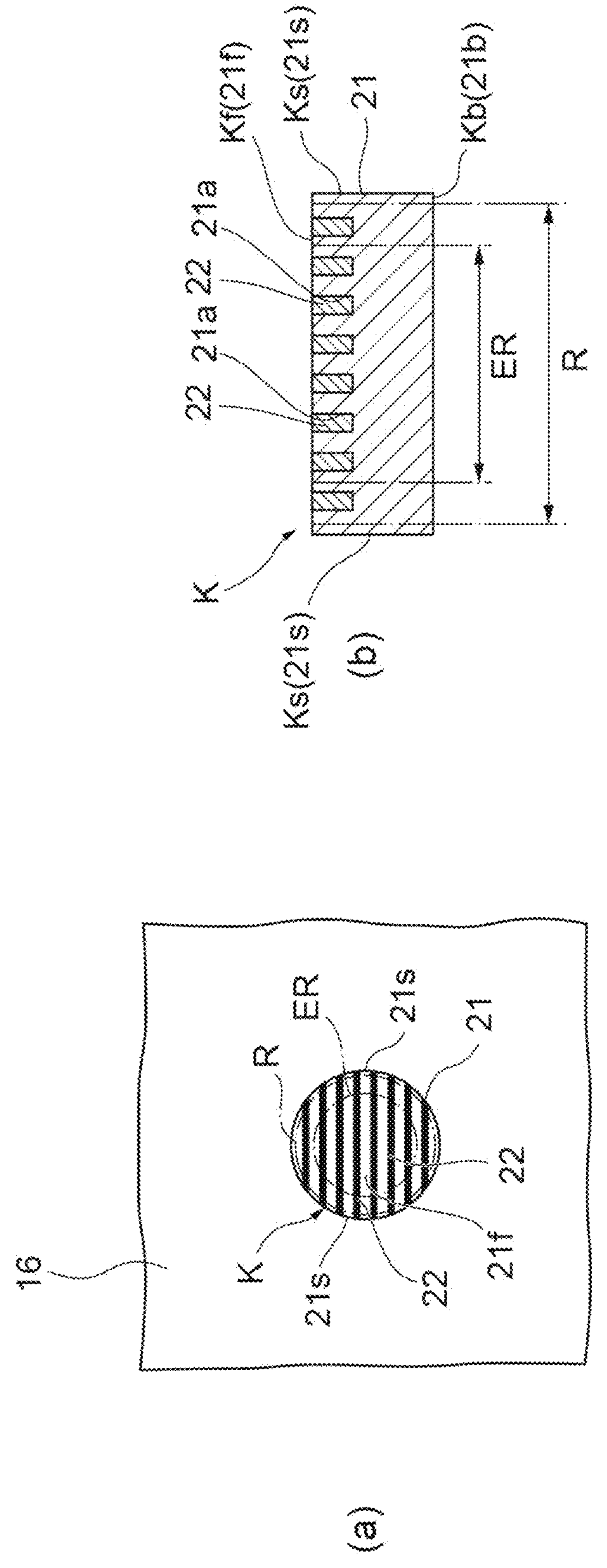
FIG. 2 is a schematic view showing one configuration example of a target.

As shown in FIGS. 1 and 2 (*a*), the target portion K is embedded in the target support surface 16. As shown in FIG. 2 (*b*), the target portion K embedded in the target support surface 16 is formed by embedding the targets 22 in a plurality of elongated groove portions 21*a* formed on a surface 21*f* of a substrate 21. For example, the substrate 21 is formed in a circular plate shape from diamond. The substrate 21 includes the surface 21*f* that is a surface on the electron beam incident side, a back surface 21*b* that is a surface opposite to the surface 21*f* and that is a portion physically and thermally connected to the target support 3, and side surfaces 21*s* that connect the surface 21*f* and the back surface 21*b* and that are portions physically and thermally connected to the target support 3.

Each of the plurality of groove portions 21*a* formed in the surface 21*f* of the substrate 21 has a rectangular cross section, and all the groove portions 21*a* are formed to extend on the surface 21*f*. More specifically, the groove portions 21*a* are formed parallel to each other and are linearly provided to connect the side surfaces 21*s* of the substrate 21, the side surfaces 21*s* being at opposite positions. End portions of the groove portions 21*a* reach the side surfaces 21*s*, and both ends of the groove portions 21*a* are open ends. For this reason, when the substrate 21 has a circular plate shape as in the example of FIG. 2 (*a*), the lengths of the groove portions 21*a* on the surface 21*f* are different from each other. When the substrate 21 has a rectangular shape, the lengths of the groove portions 21*a* on the surface 21*f* may be equal to each other.

The groove portions 21*a* are formed by, for example, inductive coupled plasma-reactive ion etching (ICP-RIE). In the present embodiment, a diameter of the substrate 21 is ϕ8 mm and a thickness of the substrate 21 is 0.5 mm. In addition, a pitch of the groove portions 21*a* (distance between the centers of the adjacent groove portions) is 20 μm, a width of the groove portions 21*a* is 6 μm, and a depth of the groove portions 21*a* is 10 μm. Namely, in this example, the groove portions 21*a* are grooves satisfying pitch≥depth≥width. FIGS. 2 (*a*) and 2 (*b*) are conceptual views for easy understanding of a configuration of the groove portions 21*a* and do not reflect the above-described numerical values. The groove portions 21*a* may be grooves satisfying depth≥pitch≥ width.

For example, tungsten is used as a forming material of the targets 22. The targets 22 are embedded in the groove portions 21*a* by, for example, chemical vapor deposition (CVD). The target portion K is formed by removing an excess portion of the targets 22 adhering to the surfaces of the substrate 21, using chemical mechanical polishing (CMP) or the like after forming the targets 22 in the groove portions 21*a* using chemical vapor deposition.

In addition, a disposition region R of the targets 22 in the target portion K is larger than the size of the electron beam EB (beam size) at the incident position P (refer to FIG. 1) on the target portion K, namely, the incident region ER of the electron beam EB. Here, the disposition region R of the target portion K is defined by a formation region of the groove portions 21*a* in the substrate 21, namely, an embedded region of the targets 22. In the present embodiment, substantially the entire surface of the substrate 21 is the disposition region R of the target portion K, and the incident region ER of the electron beam EB at the incident position P on the target portion K is approximately ϕ1 mm whereas the disposition region R of the target portion K is approximately ϕ7 mm. The target portion K is disposed on the target support surface 16 such that the electron beam EB introduced to the support accommodating portion 12 through the opening portion 13*a* of the aperture portion 13 is located at the center of the disposition region R of the target portion K.

As shown in FIG. 1, the window holding portion 15 has a cylindrical shape having the same diameter as that of the heat radiation portion 14. In the window holding portion 15, a peripheral wall portion 17 facing the target support surface 16 is provided with a fixation portion F to which the X-ray emission window 5 is fixed, and with a protrusion 18 having a rectangular cross section and protruding from an inside to the outside of the housing 4 (support accommodating portion 12) to surround the fixation portion F. Specifically, in the present embodiment, for example, the X-ray emission window 5 is formed in a rectangular plate shape with a thickness of approximately 0.5 mm from an X-ray transmissive material such as beryllium.

An opening portion Fa having a rectangular shape that is a size smaller than the X-ray emission window 5 is formed in the fixation portion F. A peripheral edge portion of the X-ray emission window 5 is airtightly bonded to an end edge portion of the opening portion Fa by brazing or the like, and accordingly, the opening portion Fa is sealed by the X-ray emission window 5. The X-ray emission window 5 fixed to the fixation portion F is disposed to face the target portion K at a predetermined inclination angle θ2 with respect to the target portion K (in more detail, the surface Kf) at a position where the X-rays L generated in a direction perpendicular to the target portion K (in more detail, the surface Kf) are transmittable through the X-ray emission window 5. The inclination angle θ2 of the X-ray emission window 5 with respect to the target portion K (in more detail, the surface Kf) is, for example, 20° to 70°. In the example of FIG. 1, the inclination angle θ2 is 30°.

Incidentally, in order to put the X-rays obtained from the X-ray emission window 5, in a more preferable state, namely, to parallelize the emission axes of the X-rays emitted from the individual targets 22, it is preferable that the X-rays L are generated in the direction perpendicular to the target portion K (in more detail, the surface Kf). For this reason, it is preferable that when the target portion K is viewed from a cross section in a thickness direction (refer to FIG. 2 (*b*)), the individual targets 22 are disposed to extend in a direction perpendicular to the target portion K (in more detail, the surface Kf) (direction of the back surface Kb) and to be separated from each other (state where the substrate 21 is sandwiched between the targets 22).

With the above-described configuration of the target portion K and the X-ray emission window 5, the electron beam EB is incident on the targets 22 of the target portion K at the inclination angle θ1, and the X-rays L generated in the direction perpendicular to the target portion K (in more detail, the surface Kf) among the X-rays L generated in the targets 22 because of the incidence of the electron beam EB transmit through the X-ray emission window 5 at the inclination angle θ3 and are extracted to the outside of the X-ray generation device 1. The inclination angle θ3 is obtained by (90°-θ1). In the example of FIG. 1, the inclination angle θ3 is 60°.

As described above, the fixation portion F is formed in the peripheral wall portion 17 of the window holding portion 15 in a state where the fixation portion F is surrounded by the protrusion 18. Namely, a thickness T2 of the protrusion 18 is sufficiently larger than a thickness T1 of the fixation portion F. In the present embodiment, a thickness T3 of the aperture portion 13 is also larger than the thickness T1 of the fixation portion F. In addition, in the present embodiment, a thickness T4 of the heat radiation portion 14 (thickness of a portion excluding the target support 3) is larger than the thickness T2 of the protrusion 18 and the thickness T3 of the aperture portion 13.

In the present embodiment, as shown in FIG. 1, a case 25 that covers an outer side of the housing 4 described above is further provided. For example, the case 25 is formed in a substantially rectangular parallelepiped shape from a conductive material such as metal. An opening portion 25*a* having the same shape as the plane shape of the fixation portion F is provided in the case 25 at a position corresponding to the fixation portion F of the X-ray emission window 5. Namely, the fixation portion F on which the X-ray emission window 5 is disposed communicates with the opening portion 25*a* of the case 25, and the X-rays L that have transmitted through the X-ray emission window 5 are extracted to the outside of the X-ray generation device 1 through the opening portion 25*a*. An X-ray shielding member 26 is disposed on an inner surface side of the case 25 except for the position of the opening portion 25*a*. The X-ray shielding member 26 is made of a material having high X-ray shielding ability (for example, a heavy metal material such as lead) and is interposed between the case 25 and the housing 4. Accordingly, a leakage of unused X-rays is suppressed and the case 25, and the housing 4 are electrically connected, so that a ground potential of the X-ray generation device 1 is stably secured.

In the example of FIG. 1, the outer diameter of the electron gun accommodating portion 11 and the outer diameter of the aperture portion 13 of the support accommodating portion 12 are larger than an outer diameter of the heat radiation portion 14 and an outer diameter of the window holding portion 15 in the support accommodating portion 12. For this reason, a step portion 25*b* is formed in the vicinity of the opening portion 25*a* of the case 25 based on a difference in outer diameter between the aperture portion 13 and the window holding portion 15. From the viewpoint that the X-rays L extracted through the X-ray emission window 5 and through the opening portion 25*a* are prevented from being shielded and from the viewpoint that the object S is placed closer to the X-ray focal point, it is preferable that the protrusion 18 and the opening portion 25*a* on which the X-ray emission window 5 is disposed are formed to be separated from the step portion 25*b*.

Figure 3:
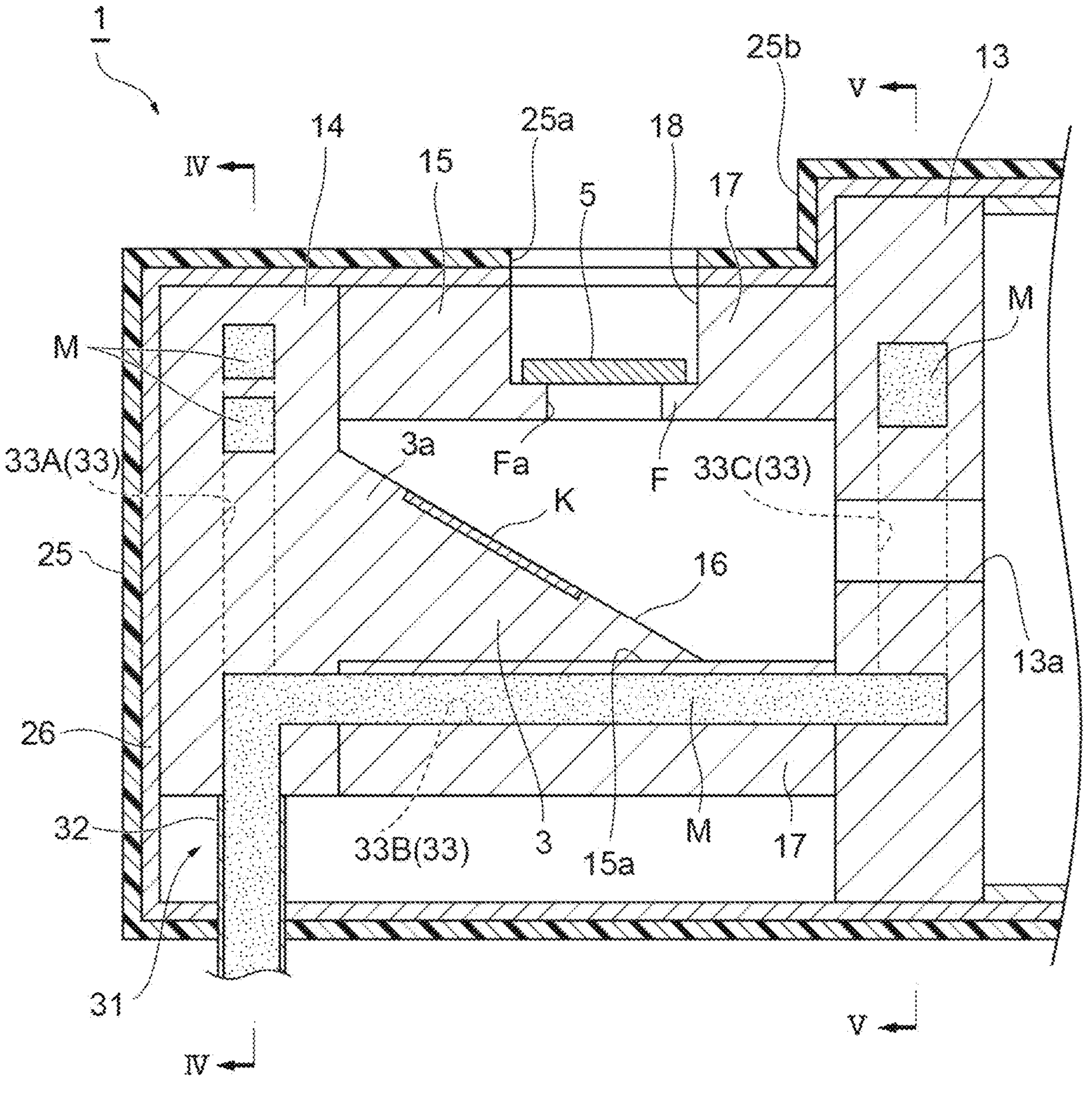
FIG. 3 is a schematic cross-sectional view showing a disposition configuration of a cooling mechanism.
Figure 4:
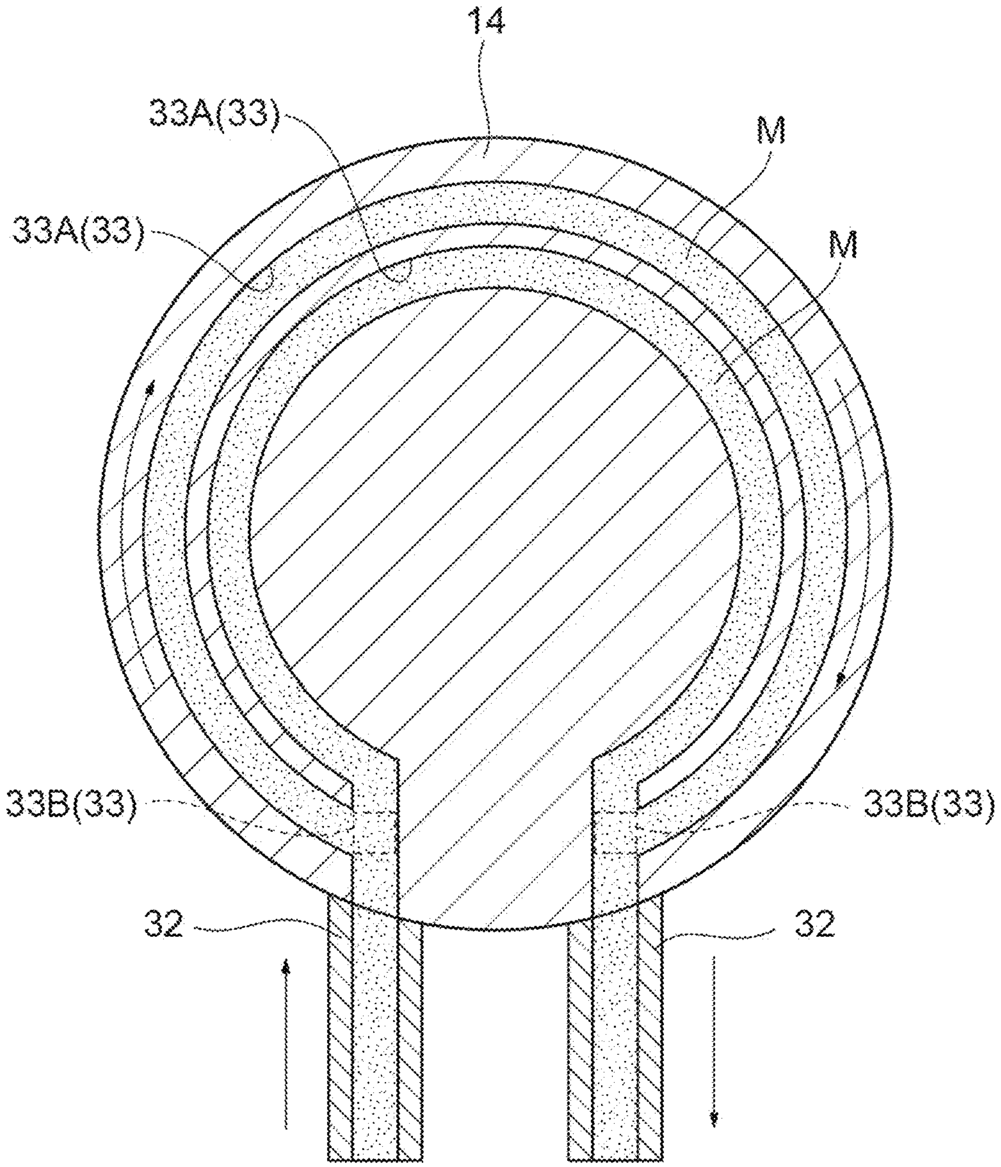
FIG. 4 is a cross-sectional view taken along line IV-IV in FIG. 3.
Figure 5:
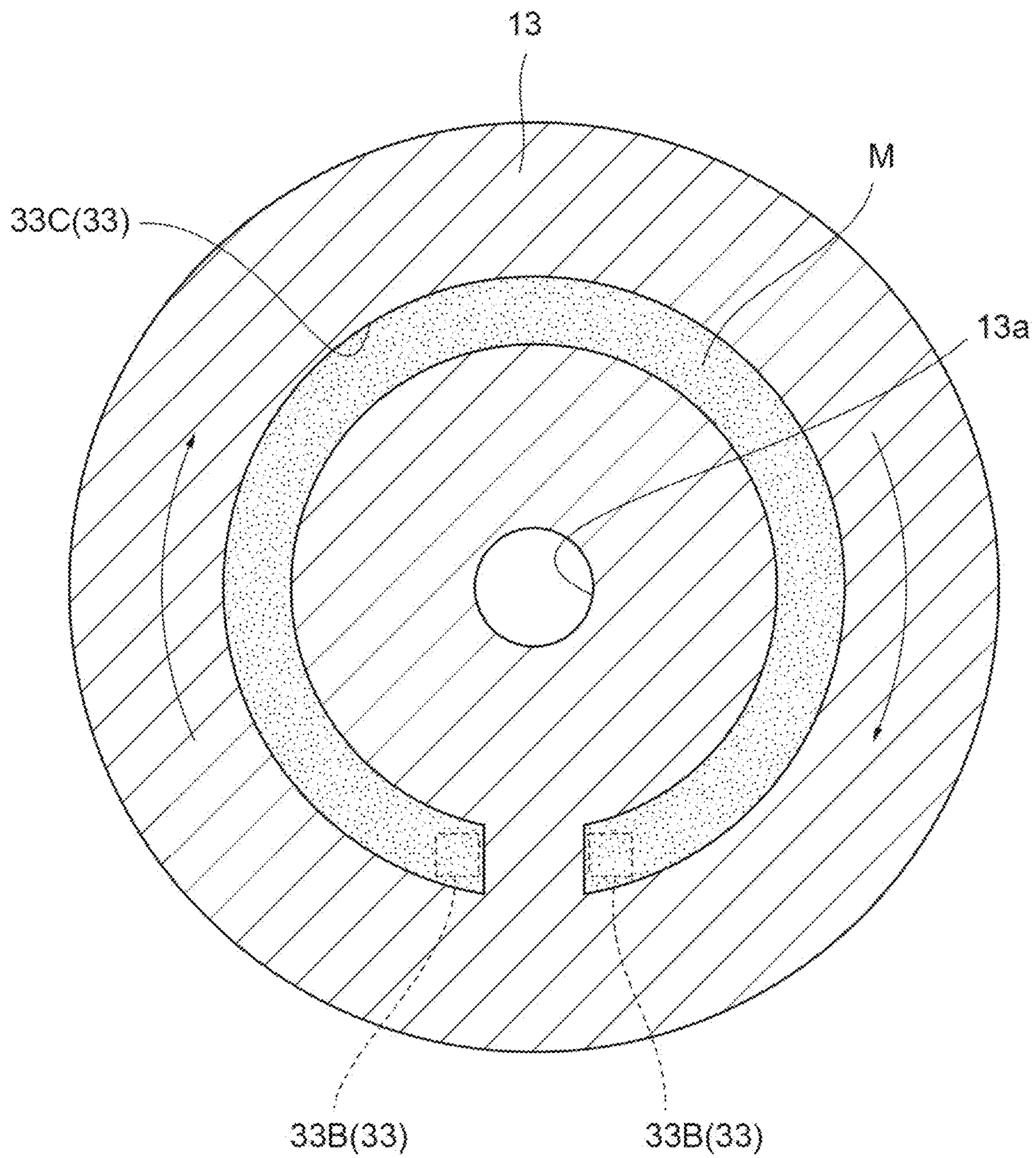
FIG. 5 is a cross-sectional view taken along line V-V in FIG. 3.

In addition, in the present embodiment, a cooling mechanism 31 that cools the support accommodating portion 12 is provided. FIG. 3 is a schematic cross-sectional view showing a disposition configuration of the cooling mechanism. In addition, FIG. 4 is a cross-sectional view taken along line IV-IV in FIG. 3, and FIG. 5 is a cross-sectional view taken along line V-V in FIG. 3. As shown in FIGS. 3 to 5, the cooling mechanism 31 is formed of a pair of connection pipes 32 that introduce and discharge a cooling medium M, and cooling flow paths (cooling portions) 33 that circulate the cooling medium M on an inside of wall portions of the support accommodating portion 12. The cooling flow paths 33 all are through-holes formed on the inside of the wall portions forming the support accommodating portion 12, and are disposed at least in the heat radiation portion 14 and in the aperture portion 13. In the present embodiment, the cooling flow paths 33 are formed of a first cooling flow path 33A provided on an inside of the heat radiation portion 14, a pair of second cooling flow paths 33B provided on an inside of the window holding portion 15, and a third cooling flow path 33C provided 25 on an inside of the aperture portion 13. For example, water or ethylene glycol is used as the cooling medium M.

As shown in FIGS. 3 and 4, the pair of connection pipes 32 are connected to the cooling flow paths 33 on a peripheral surface of the heat radiation portion 14 of the support accommodating portion 12 and are led out to the outside of the case 25. One connection pipe 32 functions as a pipe that introduces the cooling medium M from an external circulation device to the cooling flow path 33, and the other connection pipe 32 functions a pipe that takes out the cooling medium M that has circulated through the cooling flow paths 33, to the external circulation device. As shown in FIG. 4, when viewed in a longitudinal direction of the support accommodating portion 12 (of the X-ray generation device 1), the first cooling flow path 33A is provided in a double-arc shape around a center axis of the heat radiation portion 14. One end of the double first cooling flow path 33A merges at the position of connection to the second cooling flow path 33B to be described later and is connected to the one connection pipe 32, and the other end of the double first cooling flow path 33A merges at the position of connection to the second cooling flow path 33B to be described later and is connected to the other connection pipe 32.

As shown in FIG. 3, the pair of second cooling flow paths 33B extend to penetrate through the peripheral wall portion 17 of the window holding portion 15 in the longitudinal direction of the support accommodating portion 12. In the example of FIG. 3, both the pair of second cooling flow paths 33B are provided in the peripheral wall portion 17 at a position opposite to the protrusion 18. One end of one second cooling flow path 33B communicates with the double first cooling flow path 33A in the vicinity of a connection position between one end of the double first cooling flow path 33A and the one connection pipe 32, and one end of the other second cooling flow path 33B communicates with the double first cooling flow path 33A in the vicinity of a connection position between the other end of the double first cooling flow path 33A and the other connection pipe 32.

As shown in FIG. 5, when viewed in the longitudinal direction of the support accommodating portion 12, the third cooling flow path 33C is provided in a substantially arc shape around the opening portion 13*a* of the aperture portion 13 to surround the opening portion 13*a*. One end of the third cooling flow path 33C communicates with the other end of the one second cooling flow path 33B, and the other end of the third cooling flow path 33C communicates with the other end of the other second cooling flow path 33B.

Incidentally, in the present embodiment, in order to improve the cooling efficiency of the heat radiation portion 14 thermally coupled to the target support 3 that is likely to be hot, a total cross-sectional area of the first cooling flow path 33A is increased by setting a cross-sectional area of the first cooling flow path 33A to be slightly smaller than a cross-sectional area of the third cooling flow path 33C and then by disposing the first cooling flow path 33A in a double structure. However, the configuration of the first cooling flow path 33A is not limited to this configuration, and may be a configuration in which the single first cooling flow path 33A having substantially the same cross-sectional area as the cross-sectional area of the third cooling flow path 33C is provided around the center axis of the heat radiation portion 14.

In the cooling mechanism 31 having such a mechanism, the cooling medium M introduced from the one connection pipe 32 flows through the first cooling flow path 33A and is discharged from the other connection pipe 32. In addition, a part of the cooling medium M introduced from the one connection pipe 32 to the first cooling flow path 33A branches from the first cooling flow path 33A to flow through the one second cooling flow path 33B and is introduced to the third cooling flow path 33C. The cooling medium M that has flowed through the third cooling flow path 33C flows through the other second cooling flow path 33B to return to the first cooling flow path 33A and is discharged from the other connection pipe 32.

As described above, in the X-ray generation device 1, the X-ray emission window 5 is provided at the position where the X-rays L generated in the direction perpendicular to the target portion K are transmittable through the X-ray emission window 5, and the X-ray emission window 5 is disposed at the position to face the target portion K at the predetermined inclination angle θ2. When the X-ray generation device 1 is combined with an imaging device such as an image tube to form a nondestructive inspection device for the object S, in order to sufficiently secure a contrast of a captured image of the object S obtained by the image tube or the like, it is preferable that the X-rays L are emitted at the X-ray emission window 5 in the direction perpendicular to the target portion K. In addition, a magnification of the X-ray image of the object S obtained by the image tube or the like is determined by a ratio of a distance between the X-ray focal point (X-ray generation position: the incident position P of the electron beam EB on the target portion K) and an imaging position (focus to image distance: FID) to a distance between the X-ray focal point and the object S (focus to object distance: FOD). In the X-ray generation device 1, the above-described inclined disposition of the X-ray emission window 5 is adopted, so that the X-rays L generated in the direction perpendicular to the target portion K can be extracted from the X-ray emission window 5 without the incident angle of the electron beam EB being close to parallel to the targets 22. Therefore, in the X-ray generation device 1, a sufficient generation efficiency of the X-rays L can be obtained while obtaining a desired contrast and FOD.

In addition, in the X-ray generation device 1, the target support 3 that supports the target portion K is provided such that the targets 22 face the electron gun 2 at the predetermined inclination angle θ1 with respect to the emission axis of the electron beam EB, and the target portion K is supported in a state where at least a part of the target portion K is embedded in the target support 3. Accordingly, heat generated in the target portion K because of the incidence of the electron beam EB can be efficiently transferred to the target support 3. Therefore, the consumption of the targets 22 can be suppressed.

In addition, in the X-ray generation device 1, at least some of the targets 22 are in contact with the target support 3. Accordingly, heat generated in the targets 22 because of the incidence of the electron beam EB can be directly transferred to the target support 3. Therefore, the consumption of the targets 22 can be further suppressed.

In addition, in the X-ray generation device 1, the housing 4 includes the support accommodating portion 12 that accommodates the target support 3. The support accommodating portion 12 includes the aperture portion 13 that introduces the electron beam EB from the electron gun 2 toward the target portion K, and the window holding portion 15 that surrounds the target support 3 and that holds the X-ray emission window 5. As described above, both appropriate incidence of electrons and appropriate disposition of the X-ray emission window 5 with respect to the target portion K can be achieved by providing the support accommodating portion 12 through a combination of the aperture portion 13 and the window holding portion 15. In addition, as in the present embodiment, when the support accommodating portion 12 is provided with the cooling mechanism 31, the cooling flow paths 33 are easily fabricated.

In addition, in the X-ray generation device 1, the peripheral wall portion 17 of the window holding portion 15 is provided with the fixation portion F to which the X-ray emission window 5 is fixed, and with the protrusion 18 protruding from the inside to the outside of the housing 4 to surround the fixation portion F. Accordingly, even when reflected electrons (for example, electrons or the like caused by the electron beam EB reflected by the target portion K and the like) are incident on the X-ray emission window 5 or the fixation portion F to generate heat, since the heat is transferred to the protrusion 18 having a large heat capacity, an adverse influence such as damage to the X-ray emission window 5 or the fixation portion F can be suppressed.

In addition, in the present embodiment, the thickness T3 of the aperture portion 13 is larger than the thickness T1 of the fixation portion F. Accordingly, the heat capacity of the aperture portion 13 can be increased, and the influence of heat generated by, for example, electrons of the electron beam EB from the electron gun 2 can be suppressed, the electrons being incident on the aperture portion 13. Further, in the present embodiment, the support accommodating portion 12 includes the heat radiation portion 14 thermally coupled to the base end portion of the target support 3, and the thickness T4 of the heat radiation portion 14 is larger than at least one of the thickness T2 of the protrusion 18 and the thickness T3 of the aperture portion 13. For this reason, heat generated in the target portion K is transferred to the target support 3, and the heat is transferred to the heat radiation portion 14 having a large heat capacity, so that the heat generated in the target portion K can be efficiently removed.

In addition, in the X-ray generation device 1, the cooling flow paths 33 that circulate the cooling medium M are disposed on the inside of the wall portions of the support accommodating portion 12. When irradiation with the electron beam EB is performed, the support accommodating portion 12 can be efficiently cooled by circulating the cooling medium M through the cooling flow paths 33. In the present embodiment, the cooling flow paths 33 are formed of the first cooling flow path 33A provided on the inside of the heat radiation portion 14, the second cooling flow paths 33B provided on the inside of the window holding portion 15, and the third cooling flow path 33C provided on the inside of the aperture portion 13. Accordingly, when irradiation with the electron beam EB is performed, the entirety of the support accommodating portion 12 can be quickly cooled.

In addition, in the X-ray generation device 1, the disposition region R of the target portion K is sized to include the incident region ER of the electron beam EB on the target portion K. Accordingly, it is possible to suppress the shift of the incident region ER of the electron beam EB on the target portion K from the disposition region R of the target portion K, which is caused by a change in the incident position and the size of the electron beam EB, the movement of the position of the target portion K by the thermal expansion of the target portion K, or the like. Therefore, a change in the generation efficiency of the X-rays L can be suppressed. In addition, when the targets 22 are damaged by irradiation with the electron beam EB for a long period of time, a portion of the targets 22 which is not damaged can be irradiated with the electron beam EB by shifting the incident position P of the electron beam EB using, for example, magnetic force or the like.

The present disclosure is not limited to the embodiment. For example, in the embodiment, the aperture portion 13, the heat radiation portion 14, and the window holding portion 15 are combined to form the support accommodating portion 12, but the configuration of the support accommodating portion 12 is not limited to this configuration. For example, the window holding portion 15 integrated with the aperture portion 13 may be coupled to the heat radiation portion 14 to form the support accommodating portion 12, or the window holding portion 15 integrated with the heat radiation portion 14 may be coupled to the aperture portion 13 to form the support accommodating portion 12.

In addition, in the embodiment, both ends of the plurality of the groove portions 21*a* formed in the substrate 21 reach the side surfaces 21*s* to form open ends, but a configuration may be such that both ends of the plurality of groove portions 21*a* do not reach the side surfaces 21*s* and both ends of the plurality of groove portions 21*a* are not open ends. The configuration of the cooling flow paths 33 is also not limited to the embodiment, and for example, each of the first cooling flow path 33A on the inside of the heat radiation portion 14, the second cooling flow paths 33B on the inside of the window holding portion 15, and the third cooling flow path 33C on the inside of the aperture portion 13 may be an independent circulation path of the cooling medium M. A configuration may be such that any one of the first cooling flow path 33A, the second cooling flow paths 33B, and the third cooling flow path 33C is omitted.

Figure 6:
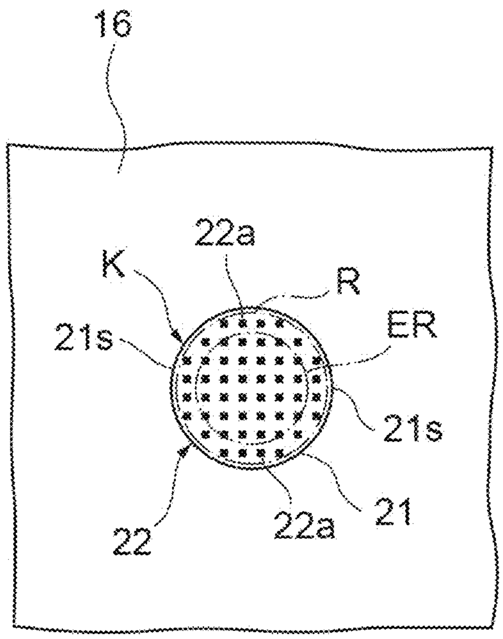
FIG. 6 is a schematic view showing another configuration example of the target.

In addition, in the embodiment, as shown in FIG. 2 (*a*), the target portion K is formed by embedding the targets 22 in the plurality of elongated groove portions 21*a* formed on the surface 21*f* of the substrate 21, but the configuration of the target portion K is not limited to this configuration. For example, as shown in FIG. 6, the targets 22 each may be divided into a plurality of segments along a longitudinal direction of the targets 22. In the example of FIG. 6, the targets 22 each are formed of a plurality of divided targets 22*a* embedded in a plurality of respective groove portions (not shown) that are linearly arranged along the longitudinal direction of the targets 22.

The plurality of divided targets 22*a* each have rectangular shapes that are congruent with each other in a plan view of the substrate 21, and are disposed at equal intervals in the longitudinal direction of the targets 22. In addition, the plurality of divided targets 22*a* of the adjacent targets 22 are disposed at equal intervals in a lateral direction of the targets 22. Therefore, as a whole of the targets 22, the plurality of divided targets 22*a* are disposed in a matrix pattern of n×m (both n and m are integers of 1 or more). As described above, the X-rays L generated in the target portion K can be emitted to the outside of the housing 4 under different conditions by changing the configuration of the target portion K.

Incidentally, an interval between the divided targets 22*a* and 22*a* in the longitudinal direction of the targets 22 and an interval between the divided targets 22*a* and 22*a* in the lateral direction of the targets 22 may be equal to or different from each other. Emission conditions of the X-rays L can be more widely adjusted by changing these intervals.

REFERENCE SIGNS LIST

1: X-ray generation device, 2: electron gun (electron gun portion), 3: target support (target portion support portion), 4: housing (housing portion), 5: X-ray emission window (X-ray emission window portion), 12: support accommodating portion (support portion accommodating portion), 13: aperture portion, 14: heat radiation portion, 15: window holding portion (window portion holding portion), 18: protrusion, 22: target, 22*a*: divided target (target), 33: cooling flow path, EB: electron beam, F: fixation portion, L: X-ray, ER: incident region, K: target portion, R: disposition region, P: incident position, T1: thickness of fixation portion, T2: thickness of aperture portion, T3: thickness of heat radiation portion, M: cooling medium, θ1, θ2: inclination angle.

The invention claimed is:

1. An X-ray generation device comprising:

an electron gun portion configured to emit an electron beam;

a target portion in which a plurality of elongated targets generate an X-ray because of incidence of the electron beam are disposed parallel to each other;

a housing portion configured to accommodate the electron gun portion and the target portion; and an X-ray emission window portion configured to be provided in the housing portion and configured to emit the X-ray generated in the target portion, to an outside of the housing portion, wherein the targets are disposed on the target portion to face the electron gun portion at a predetermined inclination angle with respect to an emission axis of the electron beam, and the X-ray emission window portion is disposed at a position where the X-ray generated in a direction perpendicular to the target portion is transmittable through the X-ray emission window portion, to face the target portion at a predetermined inclination angle.

2. The X-ray generation device according to claim 1, further comprising:

a target portion support portion configured to support the target portion such that the targets face the electron gun portion at the predetermined inclination angle with respect to the emission axis of the electron beam, wherein the target portion is supported in a state where at least a part of the target portion is embedded in the target portion support portion.

3. The X-ray generation device according to claim 2, wherein at least some of the targets are in contact with the target portion support portion.

4. The X-ray generation device according to claim 2, wherein the housing portion includes a support portion accommodating portion configured to accommodate the target portion support portion, and the support portion accommodating portion includes an aperture portion configured to introduce the electron beam from the electron gun portion toward the target portion, and a window portion holding portion configured to surround the target portion support portion and configured to hold the X-ray emission window portion.

5. The X-ray generation device according to claim 4, wherein the window portion holding portion includes a fixation portion to which the X-ray emission window portion is fixed, and a protrusion protruding from an inside to the outside of the housing portion to surround the fixation portion.

6. The X-ray generation device according to claim 5, wherein a thickness of the aperture portion is larger than a thickness of the fixation portion.

7. The X-ray generation device according to claim 5, wherein the support portion accommodating portion includes a heat radiation portion thermally coupled to a base end portion of the target portion support portion, and a thickness of the heat radiation portion is larger than at least one of a thickness of the protrusion and a thickness of the aperture portion.

8. The X-ray generation device according to claim 4, wherein a cooling portion configured to circulate a cooling medium is provided on an inside of a wall portion of the support portion accommodating portion.

9. The X-ray generation device according to claim 8, wherein the support portion accommodating portion includes a heat radiation portion thermally coupled to a base end portion of the target portion support portion, and the cooling portion is disposed at least in the aperture portion and in the heat radiation portion.

10. The X-ray generation device according to claim 1, wherein a disposition region of the targets is sized to include an incident region of the electron beam on the target portion.

* * * * *